Sept. 25, 1934.   J. WAHL   1,974,476

INFLATING COUPLING

Filed April 9, 1931

Inventor
John Wahl,
By his Attorneys,
Fraser, Myers & Manley.

Patented Sept. 25, 1934

1,974,476

UNITED STATES PATENT OFFICE 1,974,476

INFLATING COUPLING

John Wahl, Rosedale, N. Y., assignor to A. Schrader's Son, Incorporated, Brooklyn, N. Y., a corporation of New York Application April 9, 1931, Serial No. 528,854

3 Claims. (Cl. 285—169)

The present invention relates to quick detachable inflating couplings or air chucks and aims to provide certain improvements therein. The invention is in the nature of an improvement on the coupling device disclosed in the application of Frank A. Talbot, Serial No. 288,967, filed June 28, 1928.

An object of the present invention is to simplify and generally improve upon the construction of coupling disclosed in said aforementioned patent application. A further object is to so shape and mount the resilient spring blade of the locking element that it will withstand a much greater number of flexings without snapping, and thereby give to the coupling a longer period of usefulness. A still further object is to facilitate the assembling of the locking blade clip and the nipple carrying head so as to insure proper alignment of said parts, whereby to provide a manipulating control for the coupling as the same is held in the hand of an operator.

The foregoing objects and the manner of their accomplishment will be apparent from the detailed description of the invention, certain preferred embodiments of which are shown in the accompanying drawing, wherein Figure 1 is a side elevation of an inflating coupling embodying the present invention.

Figure 2:
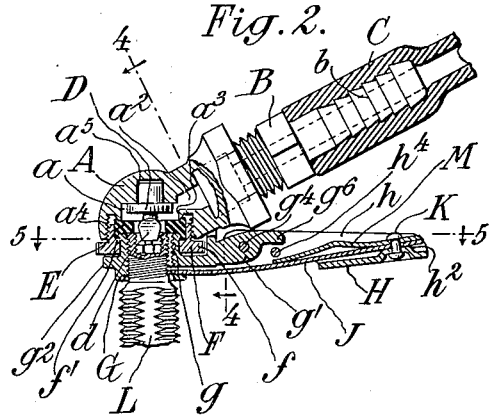
Fig. 2 is a longitudinal section partly in elevation, showing the coupling of Fig. 1 applied to a tire valve stem.
Figure 3:
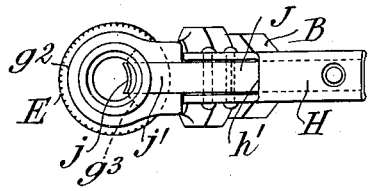
Fig. 3 is a bottom plan view of the coupling shown in Fig. 1.
Figure 4:
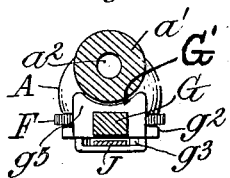
Figure 5:
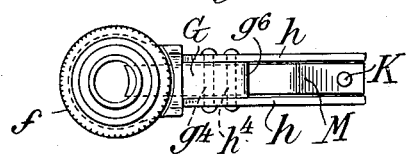

Figs. 4 and 5 are sections taken respectively along the planes of the lines 4—4 and 5—5 of Fig. 2.

Figure 6:
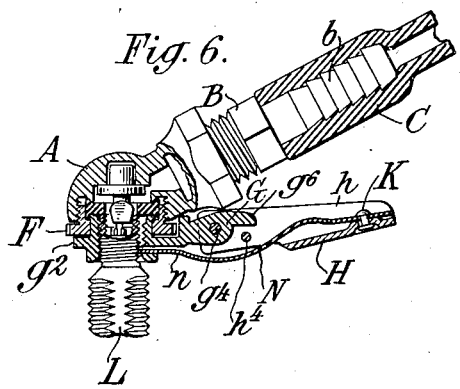

Fig. 6 is a view similar to Fig. 2 showing another embodiment of my invention.

Figure 7:
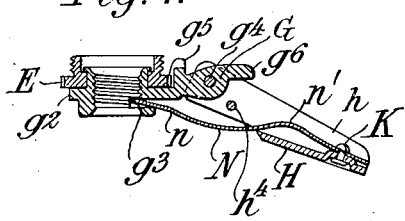

Fig. 7 is a longitudinal section of the resilient clip forming part of the coupling shown in Fig. 6.

Referring first to Figs. 1 to 5 of the drawing, let A indicate the head of the coupling member, which is substantially semi-spherical in form and is provided with an internal socket $a$ and a part $a'$ disposed at an angle to the axis of said socket, said part $a'$ having a bore $a^2$ therethrough communicating with the socket $a$, said bore at its outer end being enlarged and internally threaded to receive the screw-threaded end of a nipple B, the grooved or corrugated portion $b$ of said nipple being adapted to receive the end of a rubber hose or the like C, through which air or other fluid under pressure is conducted to the socket. Formed integrally with the head A is an annular seat $a^3$ which extends into the socket $a$, which latter has portions of different diameters, the largest of which is internally screw-threaded as indicated by reference character $a^4$. Within the socket $a$ and guided by a portion of reduced diameter $a^5$ is a check valve D having a reduced cylindrical portion which slidably fits within the reduced socket portion $a^5$ and a tire valve deflating pin $d$. A packing washer E upon which the valve D is normally held seated by air pressure, is secured within the socket against the seat $a^3$ through the medium of a rim nut F which engages the threads $a^4$.

The nut F is provided with an enlarged flange $f$ which is milled so as to facilitate being turned by the fingers of an operator, and with an internal shoulder $f'$. Swively mounted upon and carried by the nut F is a member G having an internally threaded bushing portion $g$, a lateral extension portion $g'$ and a flange $g^2$. The top of the bushing portion $g$ is spun outwardly over the shoulder $f'$ and the flange $g^2$ embraces the flange $f$ to provide the swivel connection aforementioned. When the nut F is threaded into the socket $a$ it carries with it the member G, the end of the bushing portion $g$ of which engages the packing washer E to provide a seal therewith when said nut is screwed home. The bushing portion $g$ adjacent the end opposite that which forms the seal with the packing washer is formed with a lateral slot $g^3$ through the wall thereof, the plane of said slot extending substantially perpendicular to the axis of the nipple and being disposed substantially parallel to the bottom of the lateral extension $g'$. Approximately at the middle of the lateral extension the flange $g^2$ is formed with an upstanding lug, the top surface of which is concaved to provide a cradle G' for the angularly disposed part $a'$ of the coupling head, the purpose of which will be presently made apparent.

Embracing a reduced portion of the lateral extension and pivotally connected thereto by a pin $g^4$ is a channeled actuating member or lever H having parallel side walls $h$, and having a portion of its bottom wall underlying the lateral extension cut away, as indicated at $h'$. At the free end of the actuating member a portion of its bottom wall is struck up, as indicated at $h^2$, to provide a bearing surface for a locking blade J, one end of which is arcuately recessed and formed with a chamfer $j$ and extends through the slot $g^3$, and the other end of which is secured to the lever H upon the bearing surface $h^2$ through the medium of a rivet K.

Figure 1:
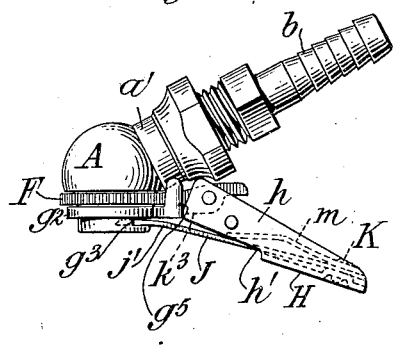

The locking blade J may be formed of any suitable material, preferably of resilient steel, and is provided with a portion which is normally disposed at an angle to a plane passing through the slot $g^3$ approximately perpendicular to the axis of the socket, and also preferably disposed in spaced relation to the underside of the lateral extension $g'$. It is also preferable that the angular disposition of the blade portion with respect to the perpendicular be in a direction opposite to that in which the offset portion $a'$ and nipple C extend. It is intended that as the lever H is moved toward the plane passing through the slot that the free end of the blade J will be withdrawn from the socket. For this to be accomplished, either the blade must be flexed intermediate its ends around a bearing member, or the mounting of the lever with respect to the socket must be such that the distance between the secured end of the locking blade and the socket is increased as the lever is moved toward the indicated plane. It is the latter form of mounting which is preferable and which has been resorted to in the present embodiment. In other words, the distance between the rivet K and the inner wall of the socket at the slot $g^3$ in Fig. 1 is less than the corresponding distance in Fig. 2. A resilient tension must therefore be placed upon the lever to normally hold it in the position shown in Fig. 1. This can be accomplished either by the inherent resiliency of the locking blade J and the manner in which it is bent, or through the medium of a supplemental resilient means, such as the arched spring M, one end of which is secured to the lever by the same rivet as the locking blade J. The disposition of the lever H with respect to the offset portion $a'$ and nipple B, as shown in Figs. 1 and 2, provides a very satisfactory handle for applying and removing the coupling, in the course of which actions pressure upon the operating lever can be readily controlled by the fingers of the operator. This proper disposition of said parts is accomplished by the offset portion $a'$ engaging in the concave cradle G' as the nut F is threaded home into the socket $a$. The extent of movement of the free end of the blade within the socket is controlled by the engagement of the shoulder $h^3$ against the portion $g^5$ of the lateral offset, while outward movement of said locking blade end is limited by engagement of the pin $h^4$ striking the lip $g^6$ of the lateral offset portion.

In Figs. 6 and 7 the locking blade N is so bent as to exert upon the lever H the necessary tension to hold it in the normal position shown in Fig. 7. Upon applying pressure to the lever H in a direction to press it toward the plane passing through the recess $g^3$ the free end of the spring is caused to slide outwardly in said recess due to the increasing of the distance between the rivet K and the inner wall of the socket at said recess. In the course of said movement, as well as in the corresponding movement of the locking blade J in Figs. 1 and 2, the blades are flexed in opposition to the bends therein. In Figs. 1 and 2 this flexing takes place substantially at the points $j'$ and $m$, and in Figs. 6 and 7 at the points $n$ and $n'$. From the foregoing detailed description, the novel features of the invention and the manner in which the device of the invention functions will be readily apparent.

While I have shown and described two preferred embodiments of my invention, I do not wish to be limited to the details of construction set forth therein, since the same may be modified without departing from the spirit of the invention.

What I claim is:

1. An inflating coupling comprising a head having a socket therein and a part disposed at an angle to the axis of said socket, a tubular part engaging in said socket having means for detachably locking said coupling upon a member, a lever pivotally connected to said last named part, said lever and said angularly disposed part serving as a gripping handle for the device, means for insuring the proper relationship of said lever with respect to said angularly disposed part as the tubular part is being connected within the socket and a swively mounted nut on the tubular part for connecting it within the socket.

2. A clip for inflating couplings or the like, comprising a part adapted for attachment to a hose nipple, a part adapted for engagement over a threaded member with which the coupling connection is to be made, said last-mentioned part having a lateral extension, an actuating member pivoted to said extension and a resilient locking blade having one end slidable in the part for connection with the threaded member, and its other end connected to said actuating member, said first two mentioned parts being swively connected together.

3. A clip for inflating couplings or the like, comprising a screw-threaded nut adapted for attachment to a hose nipple, a tubular part swively carried by said nut adapted for engagement over a threaded member with which the coupling connection is to be made, said tubular part having a lateral extension, an actuating member pivoted to said extension and a resilient locking blade having one end slidable in the tubular part, and its other end connected to said actuating member, said nut having an operating flange for manually connecting the clip to the hose nipple.

JOHN WAHL.